(No Model.)
2 Sheets—Sheet 1.
G. TAYLOR.
Machine for Operating Rock-Drills and Earth-Augers.
No. 228,418.
Patented June 1, 1880.
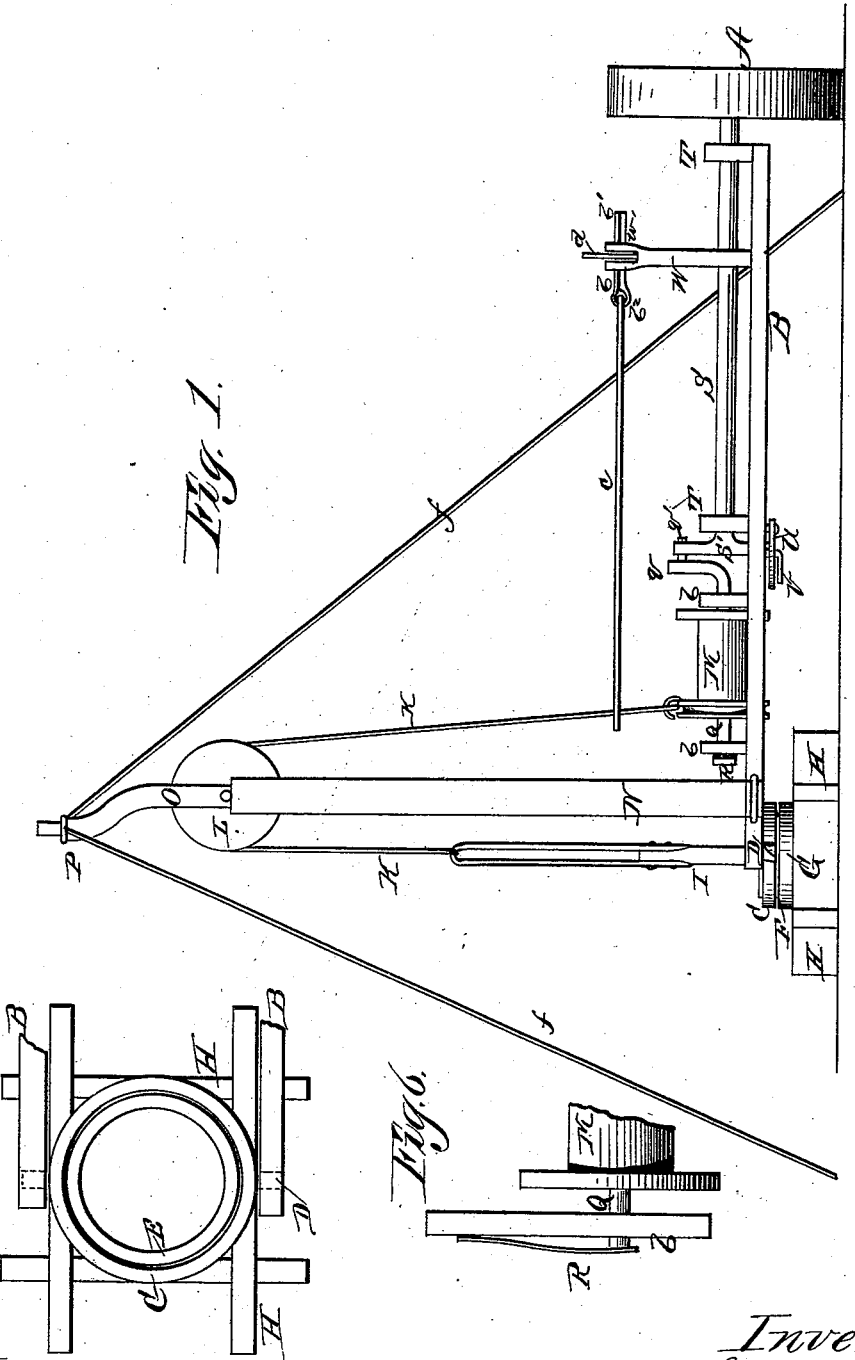
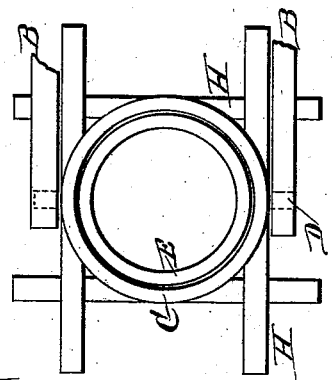
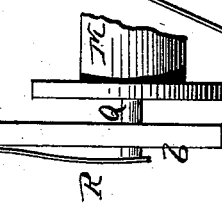
Witnesses:
Inventor
G. Taylor
per T. H. Alexander
Attorney (No Model.) 2 Sheets—Sheet 2.
G. TAYLOR.
Machine for Operating Rock-Drills and Earth-Augers.
No. 228,418. Patented June 1, 1880.
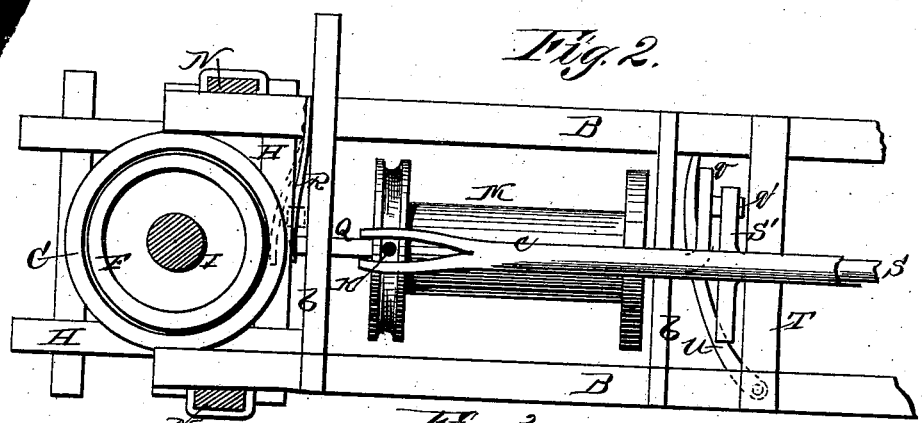
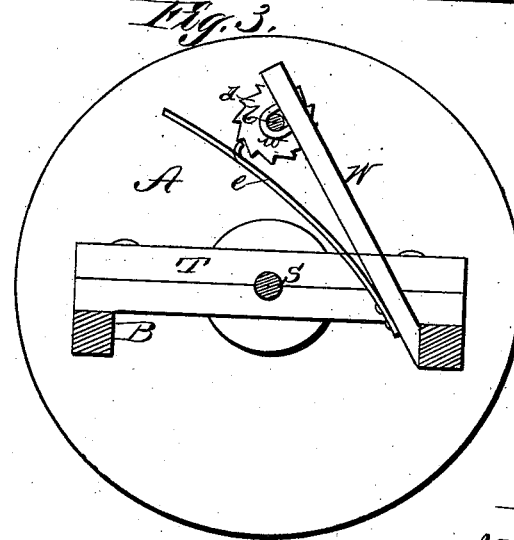
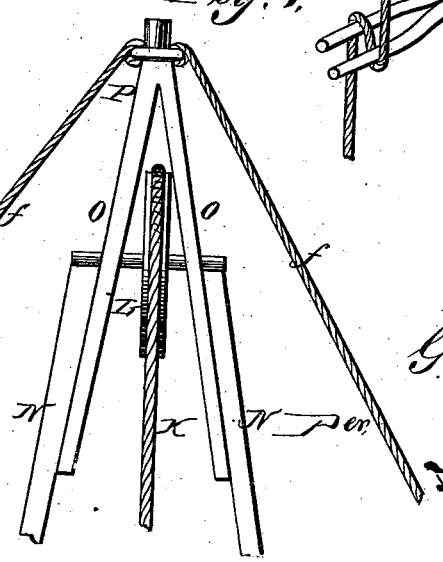

UNITED STATES PATENT OFFICE.

GAMALIEL TAYLOR, OF DE WITT, MISSOURI.

MACHINE FOR OPERATING ROCK-DRILLS AND EARTH-AUGERS.

SPECIFICATION forming part of Letters Patent No. 228,418, dated June 1, 1880.

Application filed March 4, 1880. (No model.)

*To all whom it may concern:*

Be it known that I, GAMALIEL TAYLOR, of De Witt, in the county of Carroll and State of Missouri, have invented certain new and useful Improvements in Machines for Operating Rock-Drills and Earth-Augers; and I do hereby declare that the following is a full, clear, and exact description thereof, reference being had to the accompanying drawings, and to letters of reference marked thereon, which form part of this specification.

The nature of my invention relates to machines for operating drills or augers. The improvement relates chiefly to the construction of the frame and its bearing, around which it travels, to means for operating the drill, and to means for limiting the drop of the drill, all as hereinafter fully described, and particularly pointed out in the claims.

In the drawings, Figure 1 represents a side elevation; Fig. 2, a plan view of one end, with the derrick in section; and Figs. 3, 4, 5, 6, and 7 are details of parts of my invention.

Let A represent the wheel which supports the frame D, which carries the drum or spool and other operative parts, presently referred to in detail. The horse is hitched to this frame and is driven in a circular track or path, thus causing the traverse of the wheel in a circular line of travel and the movement of the frame B around a pivotal center which is located at one end of the said frame. The pivot of this frame is formed by a ring, C, having arms D, which are secured to the frame, this ring being arranged to turn upon a short cylinder, E, having a flange or base, G, upon which the ring rests.

In arranging the machine for operation the cylinder E is mounted upon a foundation composed of cross-timbers H, these timbers being placed to form a frame around the mouth of the hole which is being drilled.

The drawings illustrate a drill, I, although an auger may be substituted for the drill, and, as it will be presently seen, an auger can be readily worked by the present apparatus.

K designates the cord or chain, which is connected at one end with the drill or auger. This cord passes up and over a pulley-wheel, L, and thence down to the drum M, to which it is secured.

The frame B carries a derrick, N, at the apex of which the pulley-wheel L is journaled in metal bars O O, secured at their lower ends to the side bars of the derrick, and uniting at a point, as at P, above the pulley-wheel.

The spool-shaft Q has its bearing in the cross-bars $b\ b$ of the main frame B. One end of this shaft is bent into crank form, as at $q$, and upon this crank-arm is a tappet, $q'$. The remaining end of the shaft Q projects through one of the cross-bars $b$, so as to be in position to be acted upon by a spring, R, which is secured to the bar through which this straight end of the shaft passes.

S designates a shaft upon which the wheel A is mounted. This shaft rotates with the wheel, and has its bearings in the bars T T, which are secured to the frame B. To that end of the said shaft S which is adjacent to the drum is applied a cross-head, S', which is employed for the purpose of acting upon the crank-arm of the spool-shaft, so that as the cross-head engages the stud or tappet upon said crank-arm the spool will be rotated and the cord which connects with the drill or auger wound upon the spool.

To the under side of one of the bars of the main frame is pivoted a curved lever-bar, U, one end of which works in a guide, V, which limits its movement. This lever is employed for the purpose of freeing the arm of the spool-shaft from contact with the cross-head upon the shaft S, so that the spool may, at certain intervals, be permitted to rotate in a direction which will cause the unwinding of the cord, and the consequent drop of the drill, the full description of which operation will be found farther on.

To one of the side bars of the main frame B is secured a standard, W, having a bifurcated upper end. Suitable bearings W' are attached to this standard W, and through these bearings is passed a bolt, $b$. This bolt is formed with a squared end, $b'$, whereby it can be readily manipulated by a wrench, and it is also formed at its other end with an eye, $b^2$, to receive the hook-shaped end of a rod, $c$.

Upon the bolt $b$ is rigidly mounted a ratchet-wheel, $d$, both the bolt and the wheel being turned by applying a wrench to the squared end of the bolt. Although not absolutely essential, yet it is preferable to have the ratchet-wheel extend into the space between the prongs of the upper end of the standard.

A spring, e, which is secured at one end to the standard or to the main frame, engages with the ratchet-wheel, and acts in conjunction therewith as a pawl.

The rod c, which is connected with the bolt b, as before set forth, has its end which extends over the spool bifurcated, and between the prongs of such bifurcated end the cord which connects with the drill is passed.

The derrick is steadied by guy-ropes f, and connected at its base with the main frame in any suitable way.

The operation is as follows: To cause the necessary rotation of the drill or auger, the horse is driven round the track, so as to draw the frame which carries the operative parts round the same, the ring at the end of the main frame being necessarily rotated upon its bearing.

To cause the drill to drop at the required intervals the curved bar U is set in position so that the crank-arm of the spool-shaft will, at a certain period of its rotation, strike against said bar. The cross-head upon the shaft S, engaging with the tappet or stud upon the crank of the spool-spindle, carries said crank around, and thus rotates the spool, until the crank-arm, by its action against the curved bar U, is thrown out of engagement with the cross-head upon shaft S.

The spool shaft or spindle is journaled in its bearings so as to have a free movement endwise, and hence by the above operation the spool and the spindle, to which it is rigidly secured, will be readily shifted away from the spindle-bearing nearest to the curved bar U. After the crank of the spool-spindle has been thus released from the cross-head of the shaft S the crank will fly round in a reverse direction by reason of the weight of the drill, said crank being arrested in its reverse motion and again turned forward by one of the arms of the cross-head, with which it will be engaged by the action of the spring, which, so soon as the crank is freed from the curved bar U, forces the spindle toward the shaft S.

The purpose of the rod c is to limit the drop of the drill. This is accomplished as follows: The bolt b, which carries the ratchet-wheel, is turned round by means of a wrench or handle. This rotates the rod c, and hence winds up the cord which is attached to the drill, and which passes between the prongs which are formed at one end of the rod c. The quantity of cord which is wound upon the bifurcated end of the rod c determines the limit of the drop of the drill, it being, of course, seen that as the cord is wound upon the spool at the requisite intervals the rod c will be drawn down toward the spool.

When desired, the spring-pressure upon the spool-spindle may be relieved therefrom by either turning the spring away from the spindle or by inserting a wedge, l, between the spring and the bar to which the spring is attached. Under this arrangement the spool-spindle can be shifted so that its crank-arm will not come in contact with the cross-head upon the shaft S. By applying any suitable brake-lever to the spool or its spindle, its rotation, caused by the descending drill, can readily be regulated.

To raise the drill or auger out of the hole, the operator will shift the curved bar U in such position that the crank of the spool-spindle will, while being carried round by the cross-head upon the shaft S, not come in contact with said curved bar.

What I claim, and desire to secure by Letters Patent, is—

1. The combination of the spool, in a machine for operating drills or augers, with the spool-spindle, adapted to be shifted endwise in its bearings, the spring bearing upon one end of the spool-spindle, and a device upon the shaft of the driving-wheel for actuating the spool-spindle, as and for the purpose set forth.

2. The combination of the spool, in a machine for operating drills or augers, with the spool-spindle having a crank-arm, the device upon the shaft S for actuating the crank-arm, and a pivoted lever, U, for shifting the spool-spindle at certain periods, substantially as herein shown and set forth.

3. The combination of the spool, in a machine for operating drills or augers, with the frame B, carrying a derrick, the pulley journaled in the derrick, a spring arranged to act against the spool-spindle, the driving-wheel having its shaft journaled in the frame, and a cross-head upon the said shaft arranged to act upon the crank-arm of the spool-spindle, and also a curved bar arranged to shift the crank-arm at certain periods away from the said cross-head, substantially as herein set forth.

4. The combination of the spool, in a machine for operating drills or augers, with the rod c, having a hinged connection with a rotary bolt or shaft, and adapted to limit the length of the cord attached to the drill or auger, substantially as set forth.

5. The combination of the rod c, bifurcated at one end and hook-shaped at its other end, with the bolt b, having an eye, $b^2$, the ratchet-wheel d, and a spring-pawl, the whole being arranged for the purpose of limiting the drop of the drill, substantially as and for the purposes set forth.

In testimony that I claim the foregoing as my own I herewith affix my signature in presence of two witnesses.

GAMALIEL TAYLOR.

Witnesses:
W. J. WILLIAMS,
S. M. COLBERT.